United States Patent [19]

Wolf et al.

[11] 3,925,310

[45] Dec. 9, 1975

[54] HIGH MOLECULAR WEIGHT COPOLYAMIDES CONTAINING HYDANTOIN UNITS

[75] Inventors: Gerhard Dieter Wolf; Hans Egon Kunzel, both of Dormagen; Günther Blankenstein, Stommeln; Peter Kleinschmidt, Dormagen; Francis Bentz, Cologne, all of Germany

[73] Assignee: Bayer Aktiengesellschaft, Leverkusen-Bayerwerk, Germany

[22] Filed: May 3, 1974

[21] Appl. No.: 466,841

Related U.S. Application Data

[63] Continuation-in-part of Ser. No. 361,526, May 18, 1973, abandoned.

[52] U.S. Cl. ......... 260/47 CZ; 260/30.2; 260/63 R; 260/65; 260/78 R; 260/DIG. 34
[51] Int. Cl.² .......................................... C08G 69/32
[58] Field of Search ............ 260/47 CZ, 63 R, 78 R, 260/65, DIG. 34

[56] References Cited
UNITED STATES PATENTS

| | | | |
|---|---|---|---|
| 3,324,086 | 6/1967 | Raleigh | 260/78 |
| 3,354,120 | 11/1967 | Bach et al. | 260/47 |
| 3,376,268 | 4/1968 | Preston | 260/78 |
| 3,484,407 | 12/1969 | Preston | 260/47 |
| 3,671,614 | 6/1972 | Kunzel et al. | 260/47 |
| 3,681,282 | 8/1972 | Preston | 260/46.5 |

FOREIGN PATENTS OR APPLICATIONS

| | | | |
|---|---|---|---|
| 2,009,741 | 9/1971 | Germany | 260/47 CZ |

*Primary Examiner*—Lester L. Lee
*Attorney, Agent, or Firm*—Plumley & Tyner

[57] ABSTRACT

High molecular weight aromatic copolyamides which contain a small proportion of structural units having hydantoin rings are disclosed. The presence of hydantoin ring units in the copolyamide results in an increased moisture absorption capacity. By using small amounts of hydantoin units, the good physical properties of the corresponding hydantoin-free polyamide are substantially retained while the moisture absorption is significantly increased. Larger amounts of hydantoin units than contemplated (15 mole % and more) do not improve the moisture absorption further and adversely affect the physical properties. The copolyamides are useful in textile applications in which the improved moisture absorption serves to make clothing prepared from such textiles more comfortable.

10 Claims, No Drawings

HIGH MOLECULAR WEIGHT COPOLYAMIDES CONTAINING HYDANTOIN UNITS

This application is a continuation-in-part of our co-pending application, Ser. No. 361,526, filed May 18, 1937 now abandoned.

This invention relates to aromatic copolyamides which contain a small proportion of co-condensed units containing hydantoin rings.

It is known that fully aromatic polyamides, which generally have good thermal properties and are comparatively incombustible, have only a limited capacity for absorbing and retaining water. The moisture absorption capacity (at 65% relative humidity and 21°C) of poly-m-phenylene-isophthalamide is given as 4.5%. One of the factors which makes textiles comfortable to wear is a good water absorption capacity of the fibers used. It is therefore desirable that fully aromatic polyamides which are used in textile applications, for example as protective clothing against heat, fire, acids and alkalies (underwear, socks, gloves, anoraks, suits and uniforms), should have a high moisture absorption capacity in order that they should be comfortable to wear. A moisture absorption capacity of 9% or more is considered desirable for wear comfort.

Compared with the corresponding fully aromatic polyamides without hydantoin units, the copolyamides of this invention containing hydantoin units are distinguished by higher moisture absorption and substantially improved solubility in polar organic solvents, which is an advantage in the production of threads and fibers.

Copolyamides containing hydantoin units are described in German Offenlegungsschrift No. 2,009,741 the specific embodiments of which relate to copolyamides containing relatively high amounts of hydantoin units compared to the copolyamides of this invention. However, it has been unexpectedly found that the hydantoin content of the German Offenlegungsschrift can be advantageously reduced to obtain copolyamides which have a better moisture absorption, higher crystallinity and therefore better physical properties, and which are more economically to produce because of the lower proportion of the expensive hydantoin component.

Accordingly, this invention relates to copolyamides containing less than 15 mol percent of hydantoin units but sufficient to produce a copolyamide having a moisture absorption of at least 9%. It is also preferred that the amount of hydantoin units be such that a detectable amount of crystallinity, characteristic of the corresponding homopolymer, be retained. The exact molar proportions of copolyamide components necessary to achieve these objectives varies somewhat with the chemical structure of the copolyamide components but in any case, the copolyamide comprises less than 15% mol percent of hydantoin units, generally in the range of 1–12 mol percent. Usually, at least about 5 mol percent of hydantoin is needed to provide the desired moisture absorption of 9%. Preferably, about 5–9.5 mol percent of hydantoin units are used and most preferably 5–9 mol percent.

Crystallinity can be determined from X-ray wide-angle diagramced in H. P. Klug and L. E. Alexander, *X-Ray Diffraction Procedures*, J. Wiley and Sons, 6 Printing, 1970.

The copolyamides which have the highest moisture absorption capacity coupled with good physical properties are those in which only a small proportion of the diamine component, namely 5 to 9.5 mol percent has been replaced by hydantoin diamine units.

This invention therefore broadly relates to high molecular weight aromatic copolyamides which have a moisture absorption of at least 9% and which contain less than 15 mol percent of structural units which contain hydantoin rings, represented by the general formula $$-HN-X-Hy-Y-Z-NH-OC-Ar-CO- \qquad (I)$$

in which

Z represents a single bond or the group $-Hy-X-$ and

X and Y may be the same or different and represent bivalent aromatic groups which consist of one or more condensed rings or several aromatic rings which are linked together by single bonds or by bridge members such as O,

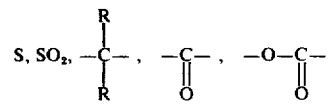

or $HN-SO_2$ or their halogen, $C_1$ to $C_4$ alkyl, $NO_2$ or CN substitution products and Hy represents a bivalent hydantoin ring of the formula

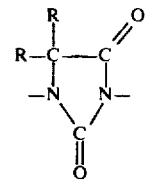

R represents a hydrogen atom, $C_1$ to $C_4$ alkyl, cycloalkyl or an optionally substituted phenyl group, and Ar represents a bivalent aromatic group which consists of one or more condensed or several aromatic rings which are linked together by single bonds or by bridge members such as O, S, $SO_2$.

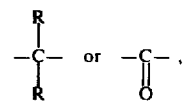

or their halogen, $C_1$ to $C_4$ alkyl, $NO_2$ or CN substitution products, and more than 85 mol percent of structural units of the general formula $$-HN-Ar'-NH-OC-Ar-CO- \qquad (II)$$

in which

Ar has the meaning indicated above and

Ar' has the meaning indicated for X, these copolyamides having a relative solution viscosity $\eta_{rel.}$ (determined on a 0.5% solution of the copolyamide in concentrated sulphuric acid at 25°C) of 1.2 to 2.5.

The copolyamides according to the invention are therefore built up of 3 components as follows:

The first component consists of one or more fully aromatic diamines corresponding to the general formula $$H_2N-Ar'-NH_2 \qquad (V)$$

in which Ar' had the meaning defined above.

The following diamines are given as examples: m-phenylene diamine, p-phenylene diamine, 4,4'-diaminodiphenylether, 4,4'-diaminodiphenylsulphide, 2,6-diaminoaphthalene, 2,7-diaminonaphthalene, benzidine, 4,4'-diaminodiphenylmethane, 4,4'-diaminodiphenylsulphone, 3,3'-diaminobenzophenone, 1,4-bis-(p-aminophenoxy)-benzene and 4,4'-bis-(p-aminophenoxy)-diphenylsulphone.

The second component consists of one or more diamines corresponding to the general formula $$H_2N-X-Hy-Y-Z-NH_2 \quad (IV)$$

in which Z, X, Y and Hy have the meanings indicated above.

The following are given as examples of such diamines:

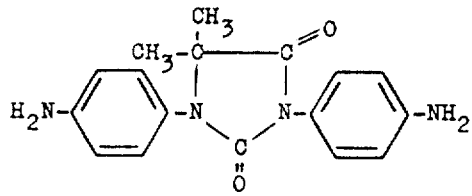

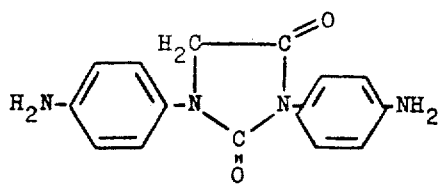

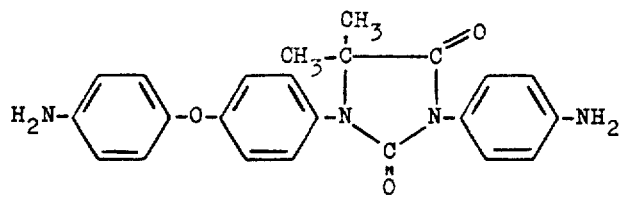

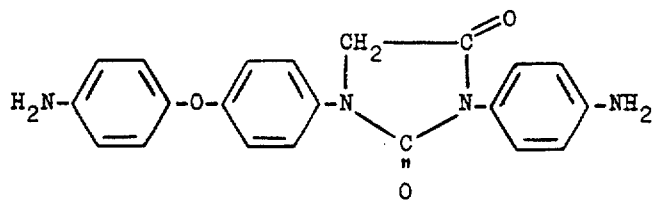

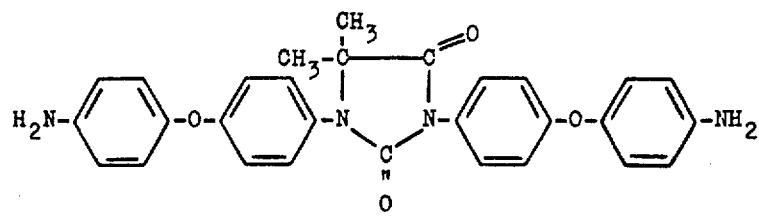

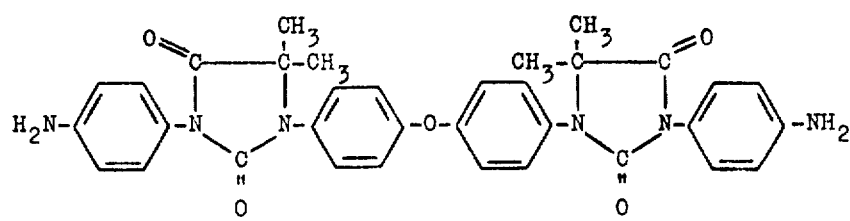

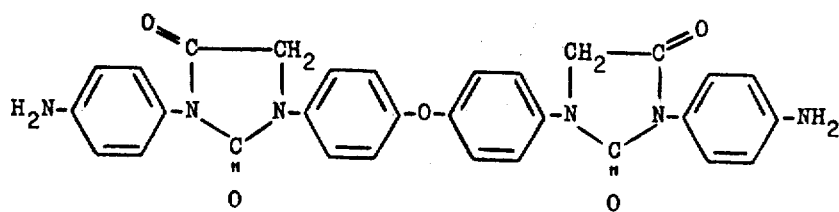

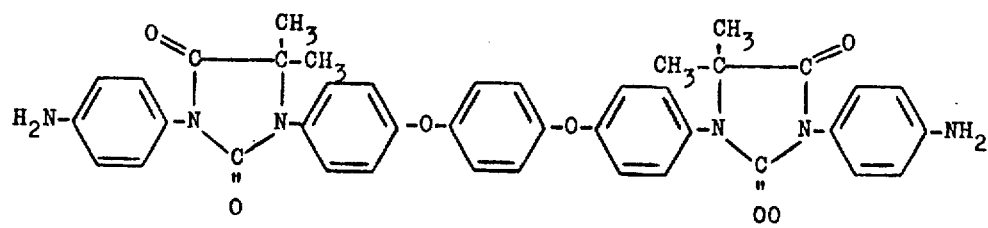

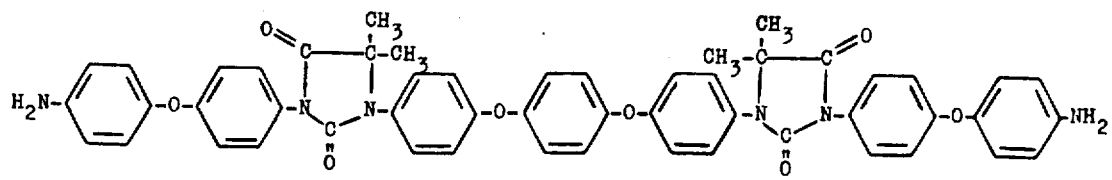

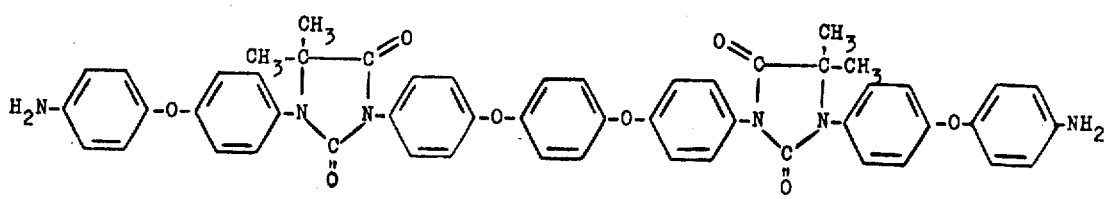

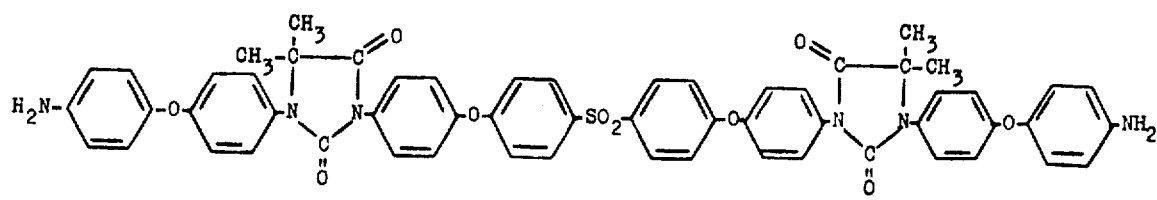

These diamines are added in the proportions indicated above in order to achieve a moisture absorption of 9% and at the same time to preserve at least some of the crystalline character of the corresponding homopolyamide.

These diamines which contain hydantoin rings may be prepared in accordance with methods already previously proposed by the present applicants, for example as follows:

Aromatic diamines which contain a hydantoin ring may be obtained by reacting N-substituted α-amino acid nitriles or esters with aromatic isocyanates in a molar ratio of 1:1 in inert solvents with ring closure of the resulting ureas to produce hydantoin derivatives, followed by reduction of the nitro groups.

Preparation of these diamines may be carried out in such a manner that both the N-substituted α-aminocarboxylic acid nitriles or esters and the aromatic isocyanates from the start contain each a nitro group or alternatively one or both nitro groups may be introduced by nitration of the hydantoin derivatives.

Suitable aromatic diamines in which two hydantoin rings separated by aromatic groups are situated between the two aromatic amino groups are, for example, those diamines which can be prepared in known manner by reacting N-substituted α-aminocarboxylic acid nitriles or esters which contain a nitro group of the formula

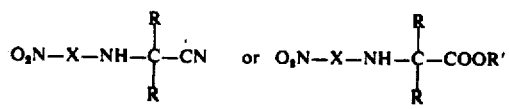

with aromatic diisocyanates of the formula
OCN—Y—NCO in which X, Y and R have the meanings defined above and R' represents $C_1$ to $C_4$ alkyl groups in a molar ratio 2 : 1 in inert solvents, followed by ring closure of the resulting ureas to form hydantoin derivatives, followed by reduction of the nitro groups.

These diamines may also be obtained by a similar reaction path by reacting aromatic isocyanates which contain a nitro group, represented by the formula

O₂N—X—NCO with aromatic compounds which contain two α-aminocarboxylic acid nitrile groups or two α-aminocarboxylic acid ester groups of the formula

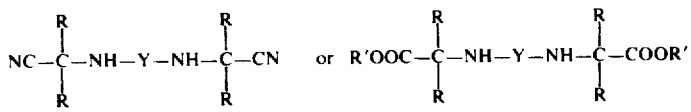

in which Y, X, R and R' have the meanings defined above, in a molar ratio of 2 : 1, followed by ring closure and reduction of the nitro groups.

The third component consists of aromatic dicarboxylic acid dihalides of the general formula Hal—OC—Ar—CO—Hal, (III)

in which Hal represents Cl or Br and Ar has the meaning indicated above. The following are given as examples of such aromatic dicarboxylic acid dihalides: Isophthalic acid dichloride, terephthalic acid dichloride, diphenyl-4,4'-carboxylic acid dichloride, naphthalene-1,5-dicarboxylic acid dichloride, naphthalene-2,6-dicarboxylic acid dichloride, diphenylether-4,4'-dicarboxylic acid dichloride, diphenylsulphone-4,4'-dicarboxylic acid dichloride, benzophenone-4,4'-dicarboxylic acid dichloride and the corresponding dibromides and alkyl- and halogen-substitution products of the given acid dihalides.

Polycondensation of the three components described above is carried out by known methods such as interfacial polycondensation but preferably by solution polycondensation in polar organic solvents such as N,N-dialkylcarboxylic acid amides, preferably N,N-dimethylacetamide, or N-alkyl-substituted lactams, preferably N-methylpyrrolidone, or in tetramethylurea or hexamethylphosphoric acid triamide, etc. or in mixtures of such polar aprotic solvents, without additional acid acceptors but optionally in the presence of solubilizing agents such as alkali metal or alkaline earth metal halides if this is necessary to keep the copolyamides in solution as they are being formed. Condensation is carried out at temperatures of between −30 and +150°C, preferably between −10 and +30°C. The reaction times may be between 1 and 30 hours. The solids content of the solutions is 5 to 40%, preferably 15 to 25%. In order to obtain very high molecular weight reaction products, it is advisable to use equimolar amounts of the diamine component (both diamines) and dicarboxylic acid dichloride component although in principle the polycondensation may also be carried out with an excess or subequivalent quantity of dicarboxylic acid dichloride. The dicarboxylic acid dichloride may be added in several small portions distributed over a period of time to the solution or suspension of the diamines in the solvent. In some cases, however, it is advisable to add the dicarboxylic acid dichloride all at once and preferably with cooling.

The hydantoin copolyamides according to the invention have good thermal and mechanical properties. They can easily be worked up and used for the manufacture of films, foils, threads and bristles which have excellent thermal and mechanical properties.

One feature which is particularly important is the substantial increased moisture absorption capacity of the polyamides according to the invention, which makes them particularly suitable for use as fibres in the textile sector for the manufacture of protective clothing (underwear, socks, gloves, suits) to protect against fire, heat, acid and alkalies.

The following Table shows that copolyamides which contain 5 to 9.5 mols percent of hydantoin units have a particularly high moisture absorption capacity. The diamine of the following formula

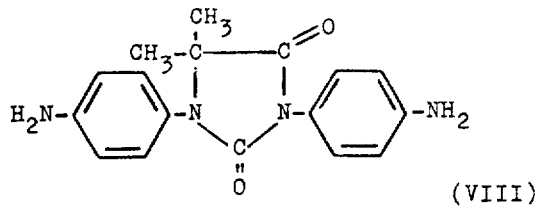

was used in this series of experiments.

| Condensate | | $H_2O$ absorption |
|---|---|---|
| Poly-m-phenyleneisophthalate | | 4.5 |
| " | with 5 − 9.5% hydantoin units | 9.1 − 10.2 |
| " | with 20 − 40% hydantoin units | 8.3 − 8.9 |

Experimental method for determining the moisture absorption capacity:

The fibres are washed at 30°C, dried and then exposed to an atmosphere of 20°C and 65% relative humidity for 24 hours to enable them to absorb moisture. The fibres are then dried in a vacuum at 80°C and the moisture absorption is measured in percent by weight of the absolutely dry fibres.

The threads may in principle be produced by any of the usual methods of dry spinning or wet spinning. The spinning solutions used were preferably polyamide solutions in dimethylacetamide or N-methylpyrrolidone which had a polyamide solids content of between 15 and 25%. The concentration of solubilizing agent used (if required), which was preferably $CaCl_2$ or LiCl, was between 3% and 12%. The viscosities of the spinning solutions were preferably between 400 and 1100 poises (measured at 20°C in a rotation viscosimeter) although solutions having viscosities of up to 2000 poises can be spun quite easily. The relative viscosity $\eta_{rel}$ of the copolyamide was between 1.3 and 2.5 but mainly between 1.4 and 1:8 (measured on a 0.5% solution in concentrated sulphuric acid at 20°C).

When the wet spinning process was employed, the threads were coagulated in an aqueous precipitation bath at 50° to 60°C and drawn off at the rate of 10 to 15 m/min from a 10 aperture die (diameter of apertures 0.1 mm). In the case of the dry spinning process, the spinning solution, which was kept at a temperature of 40°C, was extruded through a 72 or 144 aperture die (diameter of apertures 0.1 mm) into a spinning shaft heated to about 200°C with hot air, and the thread produced was drawn off at the rate of 100 m/min.

An aftertreatment is essential for the production of threads which have good textile properties. Both wet spun and dry spun threads are advantageously first prestretched to a ratio of between 1 : 1.2 and 1 : 1.5 in boiling water and then washed in water at 60°C and dried. The final stretching is then carried out to a stretching ratio of between 1 : 2 and 1 : 5 at a temperature of 300° to 350°C.

The ultimate tensile strengths of the stretched threads were between 1.5 and 5.3 g/dtex.

The following Examples are to further illustrate the invention without limiting it.

EXAMPLE 1

98.3 Parts by weight of m-phenylene diamine and 27.9 parts by weight of 1,3-bis-(p-aminophenyl)-5,5-dimethyl-hydantoin (9 mols % based on the total quantity of diamine) were introduced into 1000 parts by weight of absolute N-methyl pyrrolidone. The mixture was then cooled to about −30°C. 203 Parts by weight of isophthalic acid dichloride were added in one portion and the viscous solution then stirred for several hours at room temperature. The hydrochloric acid formed in the process of condensation was neutralised by the addition of 74.1 parts by weight of calcium hydroxide.

This solution was spun wet through a 10 aperture die with an aperture diameter of 0.1 mm into an aqueous precipitation bath at 30° to 40°C. The threads were drawn off at the rate of 10 to 15 m/min. They were then subjected to a two-stage stretching process in which they were first stretched in the ratio of 1 : 1.5 in boiling water and then, after being washed in water at 60°C, they were finally stretched at a ratio of 1 : 3.5 at 350°C. The ultimate tensile strength of the stretched threads was 2.7 to 3.0 g/dtex at an elongation of 10%. The moisture absorption capacity was determined as follows: The fibres were washed at 30°C, rapidly dried and then exposed to an atmosphere of 20°C and 40% relative humidity for moisture absorption. The fibres are then dried in a vacuum at 80°C. The moisture absorption, given in percent by weight of the absolutely dry fibres, was 9.8%.

EXAMPLE 1A

This Example shows that preparation of the copolymer described in Example 1 which consists predominantly of poly-m-phenylene isophthalamide may advantageously be carried out using 3',5''-diamino-isophthalic acid anilide of the following formula

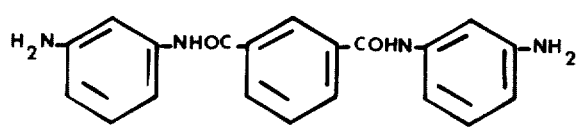

instead of m-phenylene diamine without substantial alteration in the water absorption capacity.

155.7 Parts by weight of 3',3''-diaminoisophthalic acid dianilide and 27.9 parts by weight of 1,3-bis-(p-amino-phenyl)-5,5-dimethyl-hydantoin were introduced into 900 parts by weight of N-methylpyrrolidone, and 109.6 parts by weight of isophthalic acid dichloride were then added portionwise in the course of about 2 hours at 10° to 20°C. After neutralisation with 40 g of Ca(OH)₂, the solution was spun and stretched as described in Example 1. The ultimate tensile strength of the stretched threads was 3.5 to 3.8 g/dtex at 8 to 10% elongation. The moisture absorption capacity was found to be 9.5%.

EXAMPLES 2 – 4

Modified poly-m-phenylene isophthalimide was prepared by copolycondensation of 5,6 and 8 mols percent, respectively, of 1,3-bis-p-(aminophenyl)-5,5-dimethyl-hydantoin (based on the total quantity of diamine) as described in detail in Example 1. The properties of the stretched threads are summarized in the following table:

| Example | Proportion of hydantoin diamine in mols% | Strength in g/dtex | Elongation % | Moisture absorption in % |
|---|---|---|---|---|
| 2 | 5 | 2.5 – 2.8 | ca. 8 | 9.2 |
| 3 | 6 | 2.9 – 3.6 | 10 | 9.1 |
| 4 | 8 | 2.8 – 3.2 | 10 | 10.2 |

COMPARISON EXAMPLES 2 - 4

These Examples show that the moisture absorbent capacity of modified poly-m-phenylene isophthalamides which contain 20 –]40 mols percent of units of the following formula

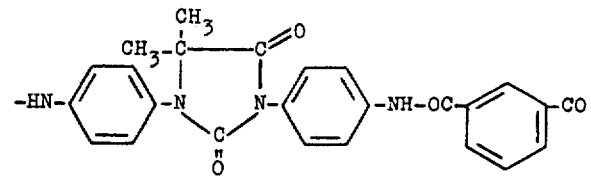

is not so high as that of the copolyamides described in Examples 2 to 4. The results of comparison Examples 2 – 4 are summarized in the following Table:

| Comparison Example | Proportion of hydantoin diamine in mols% | Strength in g/dtex | Elongation % | Moisture absorption in % |
|---|---|---|---|---|
| 2 | 20 | 3.5 – 3.8 | 7 | 8.3 |
| 3 | 30 | 3.3 – 4.0 | 5–6 | 8.9 |
| 4 | 40 | 3.0 – 3.5 | 7 | 8.7 |

The preparation of the copolyamide containing 30 mols% of hydantoin units (Comparison Example 3) is described below by way of example. 60.5 Parts by weight of m-phenylene diamine and 74.4 parts by weight of 1,3-bis-(p-aminophenyl)-5,5-dimethyl-hydantoin (30 mols %, based on the total quantity of diamine) were introduced into 890 parts by weight of absolute N-methylpyrrolidone. 162.4 Parts by weight of isophthalic acid dichloride were then added portionwise at 0° to 5°C with constant stirring and the viscous solution then continued to be stirred for several hours at room temperature. Since this copolyamide is soluble in N-methylpyrrolidone, the addition of a solubilizing agent (e.g. CaCl$_2$) is not necessary. The hydrochloric acid formed on condensation may therefore be neutralised with 93 parts by weight of propylene oxide instead of with Ca(OH)$_2$. The solution is then spun and aftertreated as described in Example 1.

EXAMPLE 5

102.5 Parts by weight of m-phenylene diamine and 34.8 parts by weight of the diamine of the following formula

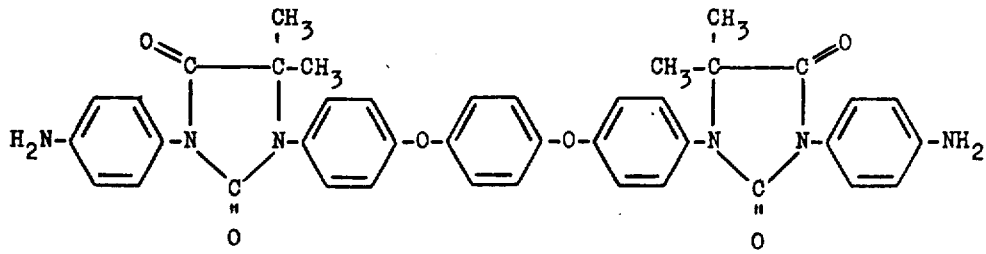

in 1020 parts by weight of N-methylpyrrolidone are reacted with 203 parts by weight of isophthalic acid dichloride as described in Example 1. The hydrochloric acid formed in the reaction was neutralised with 74.1 parts by weight of Ca(OH)$_2$. This solution was spun and aftertreated as described above. The stretched threads have an ultimate tensile strength of 2.7 and 3 g/dtex and an elongation of 10%. Their water absorption capacity is 9.7%.

We claim:

1. High molecular weight aromatic copolyamide consisting essentially of less than 15 mol percent of structural units which contain hydantoin rings of the formula $$-HN-X-Hy-Y-Z-NH-OC-Ar-CO- \quad (I)$$

in which

Z is a single bond or —Hy—X—;

X and Y, which may be the same or different, are divalent aromatic groups which consist of one or more condensed rings or several aromatic rings which are linked together by single bonds or by bridge members selected from the group consisting of

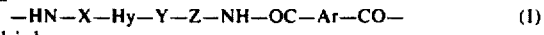

and —NH—SO$_2$—; or the halogen, C$_1$ to C$_4$ alkyl, NO$_2$ or CN substitution products of said divalent aromatic group;

Hy is a divalent hydantoin ring of the formula

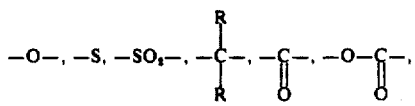

R is hydrogen, C$_1$-C$_4$ alkyl, cycloalkyl or phenyl;

Ar is a divalent aromatic group which contains of one or more condensed rings or of several aromatic rings which are linked together by single bonds or by bridge members selected from the group consisting of members —O—,—S—,—SO$_2$—,

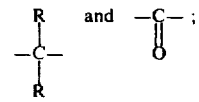

or the halogen, C$_1$ to C$_4$ alkyl, NO$_2$ and CN substitution products of said divalent aromatic group; and more than 85 mol percent of structural units of the formula $$-HN-Ar'-NH-OC-Ar-CO- \quad (II)$$

in which

Ar has the meaning indicated above; and

Ar' has the meaning indicated for X; the copolyamides having a relative solution viscosity $\eta_{rel}$ (measured on a 0.5% solution of the copolyamide in concentrated sulphuric acid at 25°C) of 1.2 – 2.5; the copolyamides containing a mol percent of hydantoin units sufficient to achieve a moisture absorption of at least 9% in a fiber prepared therefrom in which moisture absorption is measured by comparing moist fiber prepared by washing the fiber at 30°C., drying, exposure to an atmosphere of 20°C. and 65% relative humitity for 24 hours; and dry fiber dried in a vacuum at 80°C.

2. High molecular weight aromatic copolyamide of claim 1, X—Hy—Y—Z— in Formula I is

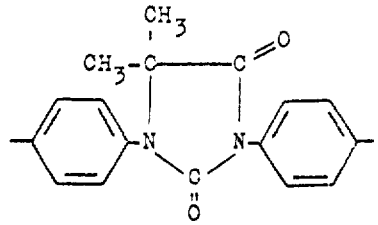

3. High molecular weight aromatic copolyamide of claim 1, in which Ar' is m— or p-phenylene.

4. High molecular weight aromatic polyamide of claim 1, in which Ar in the formulae I and II is m— or p-phenylene.

5. High molecular weight aromatic polyamide of claim 1, in which Ar in the general formulae I and II is

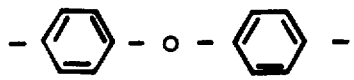

6. A fiber prepared from the high molecular weigh copolyamide of claim 1.

7. High molecular weight copolyamide of claim 1 in which said structural units containing hydantoin rings comprise 5–12 mol percent of said copolyamide.

8. High molecular weight copolyamide of claim 1 in which said structural units containing hydantoin rings comprise 5–9.5 mol percent of said copolyamide.

9. High molecular weight copolyamide of claim 1 which contains a degree of crystallinity characteristic of the corresponding polyamide without hydantoin units which crystallinity is detectable by X-ray wide angle diffraction.

10. High molecular weight copolyamide of claim 1 in which X and Y are the same or different and are phenylene, substituted phenylene, or more than one phenylene or substituted phenylene linked together by single bonds or by bridge members selected from the group consisting of

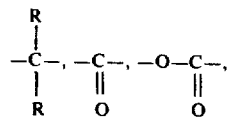

and —NH—SO$_2$—; wherein said substituted phenylene is substituted with halogen, C$_1$ to C$_4$-alkyl, NO$_2$ or CN; and Ar is naphthylene, phenylene, substituted phenylene, or more than one phenylene or substituted phenylene linked together by single bonds or by bridge members selected from the group consisting of

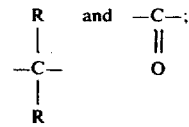

wherein said substituted phenylene is as defined above.

* * * * *